United States Patent
Juang et al.

(10) Patent No.: US 9,548,673 B1
(45) Date of Patent: Jan. 17, 2017

(54) MASTER-SLAVE VOLTAGE DOUBLING FULL-WAVE RECTIFIER FOR WIRELESS POWER TRANSFER SYSTEM

(71) Applicants: Ying-Zong Juang, Hsinchu (TW);
Hann-Huei Tsai, Hsinchu (TW);
Po-Chang Wu, Hsinchu (TW);
Kuei-Cheng Lin, Hsinchu (TW);
Chih-Yuan Yeh, Hsinchu (TW)

(72) Inventors: Ying-Zong Juang, Hsinchu (TW);
Hann-Huei Tsai, Hsinchu (TW);
Po-Chang Wu, Hsinchu (TW);
Kuei-Cheng Lin, Hsinchu (TW);
Chih-Yuan Yeh, Hsinchu (TW)

(73) Assignee: NATIONAL APPLIED RESEARCH LABORATORIES, Hsinchu (TW)

( * ) Notice: Subject to any disclaimer, the term of this patent is extended or adjusted under 35 U.S.C. 154(b) by 0 days.

(21) Appl. No.: 14/948,409

(22) Filed: Nov. 23, 2015

(30) Foreign Application Priority Data

Sep. 3, 2015 (TW) .............................. 104129170 A

(51) Int. Cl.
*H02M 7/04* (2006.01)
(52) U.S. Cl.
CPC ..................... *H02M 7/04* (2013.01)
(58) Field of Classification Search
CPC ............ H02M 7/04; H02M 7/06; H02M 7/10; H02M 7/103; H02M 7/217; H02M 7/25
See application file for complete search history.

(56) References Cited

U.S. PATENT DOCUMENTS

| | | | | |
|---|---|---|---|---|
| 3,295,047 A | * | 12/1966 | Tarczy-Hornoch ... | H02M 7/103 363/61 |
| 3,526,821 A | * | 9/1970 | Thomas ............... | B23K 9/1081 307/110 |
| 3,849,717 A | * | 11/1974 | Walz ..................... | H02M 7/103 363/61 |
| 3,911,292 A | * | 10/1975 | Petrick .................. | H02M 7/103 307/110 |
| 4,073,004 A | * | 2/1978 | Chambers ........... | H02M 3/3378 361/90 |
| 4,298,926 A | * | 11/1981 | Black .................... | H02M 7/103 331/113 R |
| 4,667,280 A | * | 5/1987 | Takamura ............. | H02M 7/103 307/110 |

(Continued)

*Primary Examiner* — Timothy J Dole
*Assistant Examiner* — Yusef Ahmed

(57) ABSTRACT

The invention includes two parallel paths. A first path is composed of two contact ends of a first electronic switch and a first, third and fifth diodes, which connect in series. One contact end connects a first end of an AC source, and a control end connects a second end of the AC source. A second path is composed of two contact ends of a second electronic switch and a second, fourth and sixth diodes, which connect in series. One contact end connects the second end of the AC source, and a control end connects the first end of the AC source. The AC source is connected between the positive ends of the first and second diodes. The second end of the AC source separately connects negative ends of the first and third diodes through two capacitors. The first end of the AC source separately connects negative ends of the second and fourth diodes through another two capacitors. Negative ends of the fifth and sixth diodes connect together to form a voltage output end.

4 Claims, 4 Drawing Sheets

(56) References Cited

U.S. PATENT DOCUMENTS

| | | | | |
|---|---|---|---|---|
| 4,821,165 A * | 4/1989 | Gunn | .................... | H02M 7/10 327/531 |
| 4,945,464 A * | 7/1990 | Gunn | .................... | H02M 7/10 363/61 |
| 4,995,069 A * | 2/1991 | Tanaka | .................. | A61B 6/035 378/101 |
| 5,268,833 A * | 12/1993 | Axer | .................... | H02M 7/217 323/351 |
| 8,362,657 B2 * | 1/2013 | Kato | .................. | H01L 27/1214 307/149 |
| 8,369,118 B2 | 2/2013 | Wu et al. | | |
| 9,042,144 B1 | 5/2015 | Lee | | |
| 2002/0067631 A1 * | 6/2002 | Lunding | .............. | H02M 3/285 363/131 |
| 2007/0290674 A1 * | 12/2007 | Bolz | ................. | G01R 31/3658 324/119 |
| 2009/0010034 A1 * | 1/2009 | Yamase | ................ | H02M 7/103 363/127 |
| 2009/0067208 A1 * | 3/2009 | Martin | ................... | H02J 17/00 363/126 |
| 2009/0261863 A1 * | 10/2009 | Kurihara | .................. | H03K 5/19 327/89 |
| 2010/0072971 A1 * | 3/2010 | Nuebling | ................ | H02M 1/08 323/299 |
| 2010/0309701 A1 | 12/2010 | Wu et al. | | |
| 2011/0032736 A1 * | 2/2011 | Richards | .............. | H02M 7/103 363/59 |
| 2011/0157933 A1 * | 6/2011 | Nagasaki | .............. | H02M 7/103 363/61 |
| 2012/0195080 A1 * | 8/2012 | Smith | ..................... | H02M 7/10 363/61 |
| 2013/0064565 A1 * | 3/2013 | Yasukawa | ............ | H02M 7/103 399/88 |
| 2013/0084402 A1 * | 4/2013 | Yamasaki | ................ | B05B 5/04 427/469 |
| 2014/0098583 A1 * | 4/2014 | Nishibori | ........... | H02M 1/4225 363/89 |
| 2014/0104896 A1 | 4/2014 | Tallam | | |
| 2016/0118817 A1 * | 4/2016 | Uno | ...................... | H02M 3/156 320/166 |
| 2016/0233406 A1 * | 8/2016 | Kurikuma | ................ | H02N 2/18 |

* cited by examiner

9,548,673 B1

MASTER-SLAVE VOLTAGE DOUBLING FULL-WAVE RECTIFIER FOR WIRELESS POWER TRANSFER SYSTEM

BACKGROUND OF THE INVENTION

1. Technical Field

The invention relates to rectifiers, particularly to voltage doubling full-wave rectifiers.

2. Related Art

A rectifier is used for converting AC power to DC power and can be applied in many fields. Rectification of rectifiers can divided into three species as follows:

1. The first species is passive rectifying circuitry, i.e., a half-wave or full-wave rectifying circuit composed of diodes. Its conversion efficiency is about 55%~65%.

2. The second species is voltage doubling rectifying circuitry, which utilizes multi-staged half-wave rectifying circuit to obtain higher DC voltage output and conversion efficiency. Its conversion efficiency is about 75%.

3. The third species is active rectifying circuitry, which is composed of various solid state electronic switches and comparators. Loss of power conversion can be reduced by the comparators so as to reach conversion efficiency of 85%~96%.

The conversion efficiency of the active rectifying circuitry is high enough, but its circuitry framework is very complicated. Contrarily, the passive rectifying circuitry is so simple in structure, but its conversion efficiency is the worst among others.

Recently, wireless charge technology has fast development and is extensively applied to portable electronic devices such as smartphones and tablets. Wireless charge must use a rectifier and portable electronic devices must emphasize using efficiency of battery and limitation of volume and weight. Thus, a rectifier with high efficiency and simple structure is urgently necessary.

SUMMARY OF THE INVENTION

An object of the invention is to provide a master-slave voltage doubling full-wave rectifier, which can reach relatively high conversion efficiency by means of a relatively simple circuitry.

To accomplish the above object, the master-slave voltage doubling full-wave rectifier of the invention includes:

a first electronic switch, having a first control end and two first contact ends, wherein the two first contact ends separately connect a ground end and a first end of an AC (alternating current) power source, and the first control end connects a second end of the AC power source;

a second electronic switch, having a second control end and two contact ends, wherein the two second contact ends separately connect the ground end and the second end of the AC power source, and the second control end connects the first end of the AC power source;

a first diode, having a positive end connecting the first end of the AC power source;

a second diode, having a positive end connecting the second end of the AC power source;

a first capacitor, connected between the second end of the AC power source and a negative end of the first diode;

a second capacitor, connected between the first end of the AC power source and a negative end of the second diode;

a third diode, having a positive end connecting the negative end of the first diode;

a fourth diode, having a positive end connecting the negative end of the second diode;

a third capacitor, connected between the second end of the AC power source and a negative end of the third diode;

a fourth capacitor, connected between the first end of the AC power source and a negative end of the fourth diode;

a fifth diode, having a positive end connecting the negative end of the third diode;

a sixth diode, having a positive end connecting the negative end of the fourth diode and a negative end connecting a negative end of the fifth diode to form a voltage output end; and a filter capacitor, connected between the voltage output end and the ground end.

DETAILED DESCRIPTION OF THE INVENTION

Figure 1:
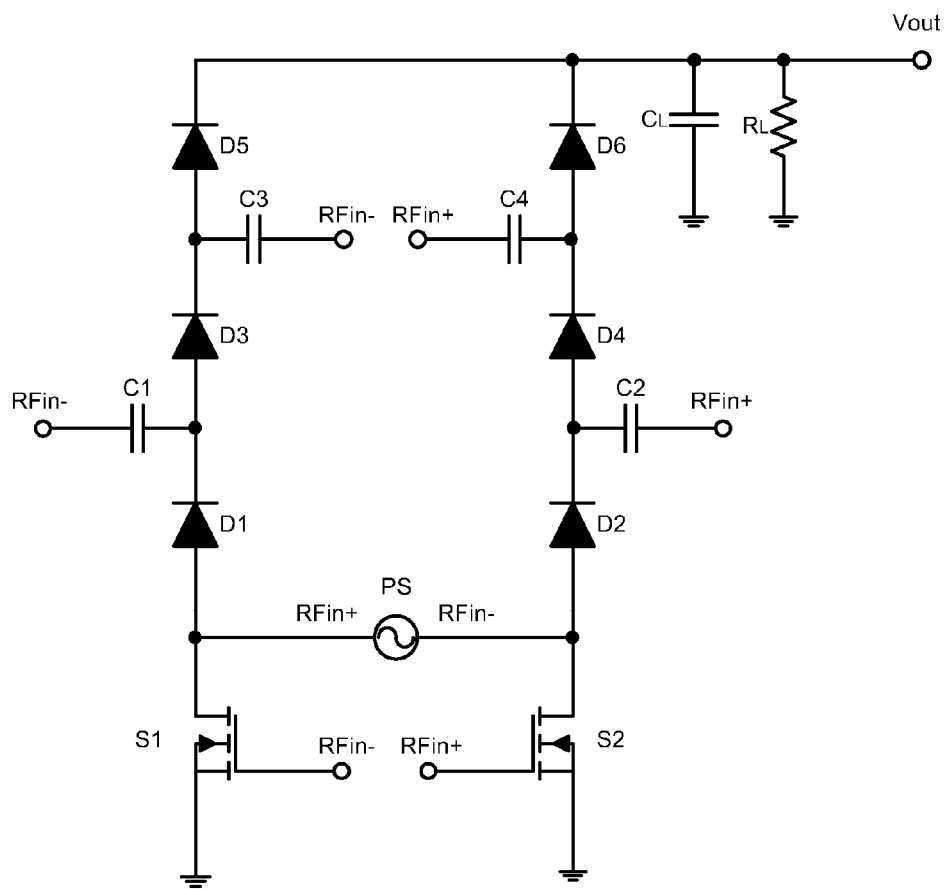
FIG. 1 is a circuit diagram of the invention.

Please refer to FIG. 1. The invention provides a master-slave voltage doubling full-wave rectifier, which primarily includes a master-stage full-wave rectifying circuit (composed of two diodes D1 and D2 and two electronic switches S1 and S2) and a slave-stage auxiliary charging circuit (composed of four diode D3-D6 and four capacitors C1~C4). Because of the phase division switching by the electronic switches, the DC voltage and conversion efficiency can be increased. And opposite voltage polarity of positive and negative half cycles further makes the capacitors double voltage and enhances conversion efficiency. Additionally, a differential input signal is connected to two ends of capacitors so as to reduce power conversion loss resulting from high switching frequency. The diodes D1-D6 may be MOS (metal-oxide-semiconductor) diodes or equivalent diodes.

The invention includes two electronic switches S1 and S2, six diodes D1-D6 and four capacitors C1-C4. The two electronic switches S1 and S2 are solid state devices such as MOSFETs (metal-oxide-semiconductor field-effect transistors). The first electronic switch S1 has a first control end (i.e., the gate of MOSFET) and two contact ends (i.e., the drain and source of MOSFET). The two first contact ends separately connect a ground end and a first end (RFin+) of an AC (alternating current) power source PS. The first control end connects a second end (RFin−) of the AC power source PS. The second electronic switch S2 has a second control end (gate) and two contact ends (drain and source). The two second contact ends separately connect the ground end and the second end (RFin−) of the AC power source PS. The second control end connects the first end (RFin+) of the AC power source PS.

A positive end of a first diode D1 is connected to the first end (RFin+) of the AC power source PS. A positive end of a second diode D2 is connected to the second end (RFin−) of the AC power source PS. Two ends of a first capacitor C1 are connected between the second end (RFin−) of the AC power source PS and a negative end of the first diode D1. Two ends of a second capacitor C2 are connected between the first end (RFin+) of the AC power source PS and a negative end of the second diode D2. A positive end of a third diode D3 is connected to the negative end of the first diode D1. In other words, the positive end of the third diode D3, the negative end of the first diode D1 and an end of the first capacitor C1 are connected to each other. A positive end of a fourth diode D4 is connected to the negative end of the second diode D2. In other words, the positive end of the fourth diode D4, the negative end of the second diode D2 and an end of the second capacitor C2 are connected to each other.

Two ends of a third capacitor C3 are connected between the second end (RFin−) of the AC power source PS and a negative end of the third diode D3. Two ends of a fourth capacitor C4 are connected between the first end (RFin+) of the AC power source PS and a negative end of the fourth diode D4. A positive end of a fifth diode D5 is connected to the negative end of the third diode D3. In other words, the positive end of the fifth diode D5, the negative end of the third diode D3 and an end of the third capacitor C3 are connected to each other. A positive end of a sixth diode D6 is connected to the negative end of the fourth diode D4. And a negative end of the sixth diode D6 is connected to a negative end of the fifth diode D5 to form a voltage output end. In other words, the positive end of the sixth diode D6, the negative end of the fourth diode D4 and an end of the fourth capacitor C4 are connected to each other. A filter capacitor CL is connected between the voltage output end and the ground end.

In sum, the two first contact ends of the first electronic switch S1, the first diode D1, the third diode D3 and the fifth diode D5 are connected in series to form a path, and the two second contact ends of the second electronic switch S2, the second diode D2, the fourth diode D4 and the sixth diode D6 are connected in series to form another path. These two paths are parallel and symmetrical.

Figure 2:
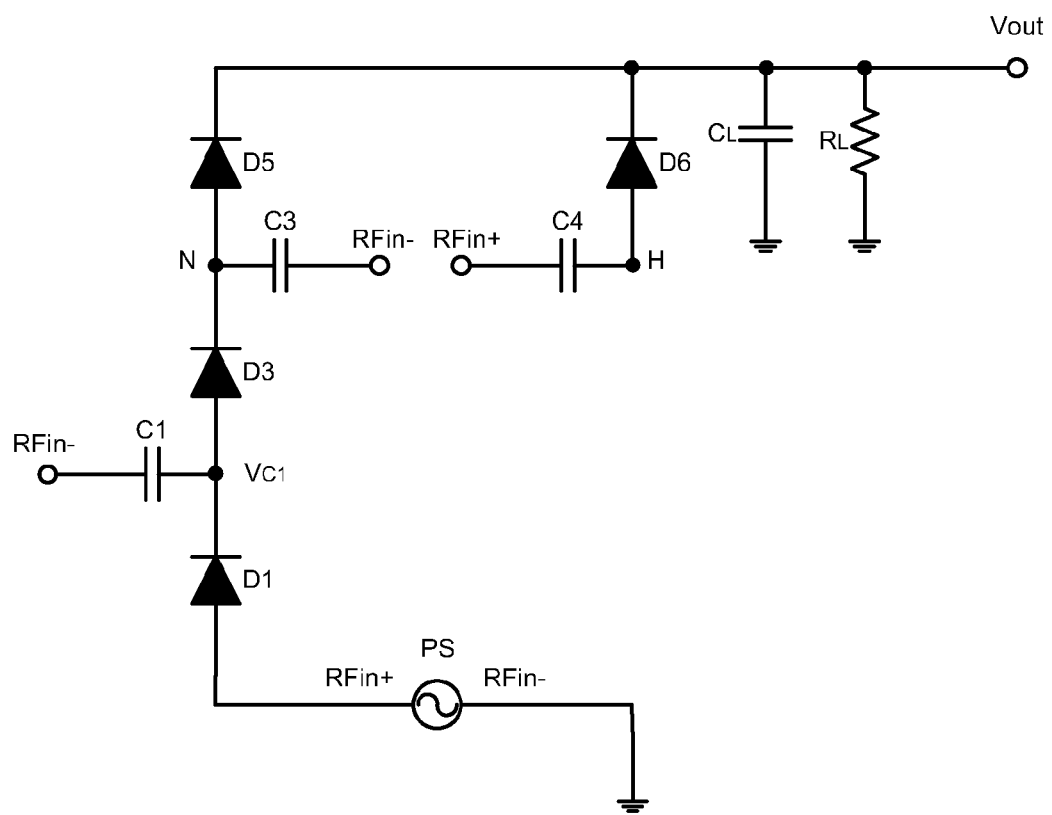
FIG. 2 is an equivalent circuit diagram of the invention in positive half cycle input.

Please refer to FIG. 2. When the AC power source PS is in a positive half cycle, the first diode D1 and the second electronic switch S2 in the master-stage circuit and the sixth diode D6 in the slave-stage circuit will become conductive first, and voltages of the first capacitor C1 and the filter capacitor CL are: VC1=2A−Vd and Vout=A−Vd, respectively, where A stands for input voltage amplitude, and Vd stands for conduction voltage of diode. When the voltage of the first capacitor C1 reaches VC1=2A−Vd, the third diode D3 will become conductive. At this time, the voltage at node N is (3A−2Vd) and the output voltage Vout=2A−2Vd.

Figure 3:
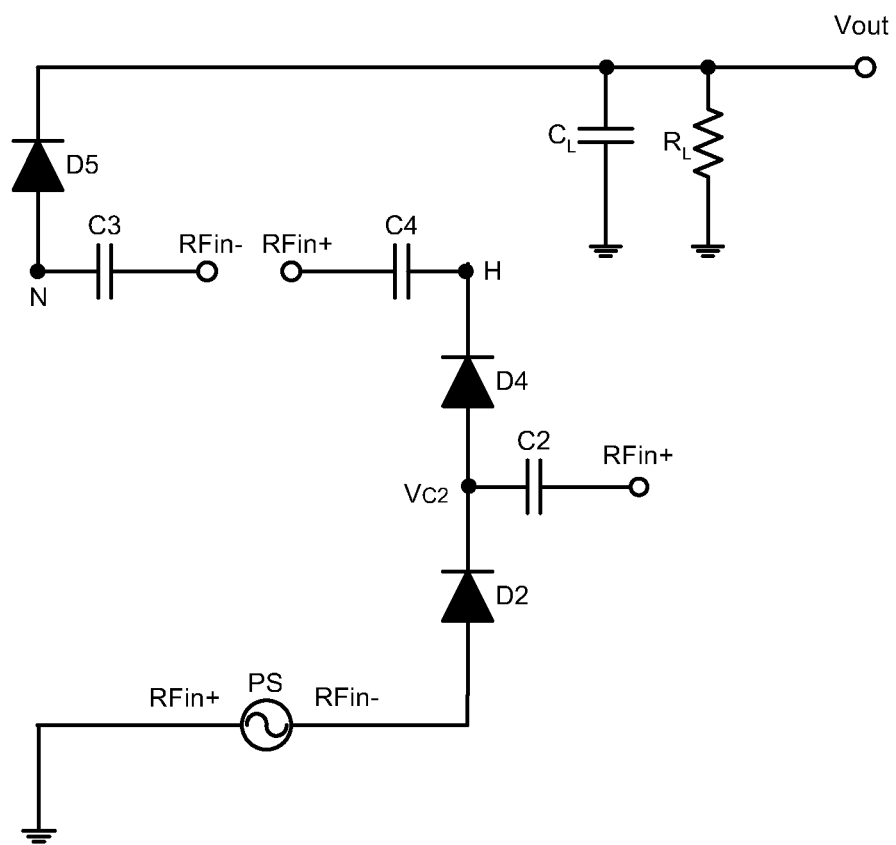
FIG. 3 is an equivalent circuit diagram of the invention in negative half cycle input.

Please refer to FIG. 3. When the AC power source PS is in a negative half cycle, the second diode D2 and the first electronic switch S1 in the master-stage circuit will become conductive first, and a voltage of the second capacitor C2 is: VC2=2A−Vd. When the voltage of the second capacitor C2 reaches VC2=2A−Vd, the fourth diode D4 will become conductive. At this time, the voltages at nodes H and N are (3A−2Vd) and (4A−2Vd), respectively, and the output voltage reaches Vout=2A−Vd, and will hold at (2A−Vd). This can obtain an effect of voltage doubling.

Additionally, the slave-stage auxiliary charge circuit may be extended with one or more stages to accomplish a higher voltage.

Figure 4:
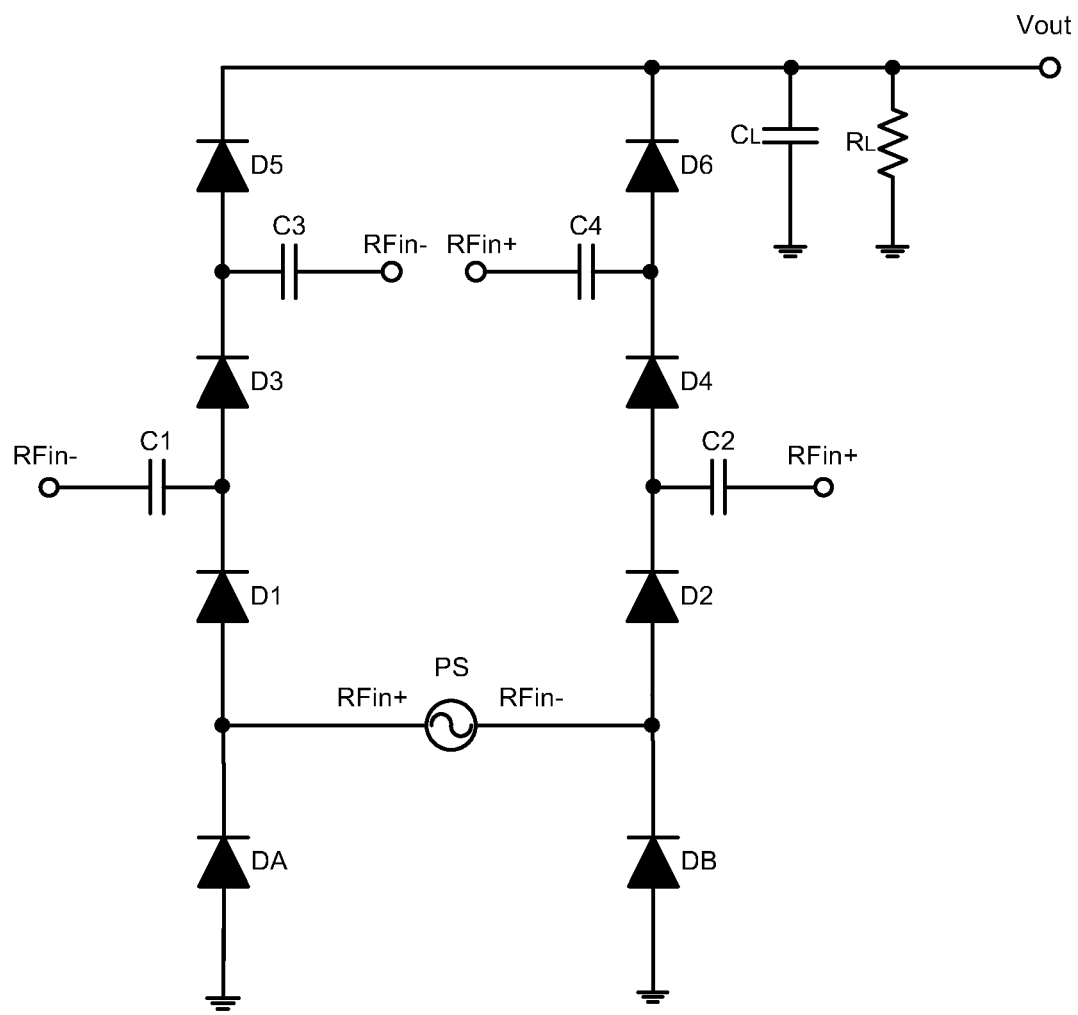
FIG. 4 is a circuit diagram of another embodiment of the invention.

FIG. 4 shows another embodiment of the invention, which replaces the electronic switches with diodes DA and DB. This can also accomplish the equivalent circuits as shown in FIGS. 2 and 3.

It will be appreciated by persons skilled in the art that the above embodiment has been described by way of example only and not in any limitative sense, and that various alterations and modifications are possible without departure from the scope of the invention as defined by the appended claims.

What is claimed is:

1. A master-slave voltage doubling full-wave rectifier comprising:
    a first electronic switch, having a first control end and two first contact ends, wherein the two first contact ends separately connect a ground end and a first end of an AC (alternating current) power source, and the first control end connects a second end of the AC power source;
    a second electronic switch, having a second control end and two second contact ends, wherein the two second contact ends separately connect the ground end and the second end of the AC power source, and the second control end connects the first end of the AC power source;
    a first diode, having a positive end connecting the first end of the AC power source;
    a second diode, having a positive end connecting the second end of the AC power source;
    a first capacitor, connected between the second end of the AC power source and a negative end of the first diode;
    a second capacitor, connected between the first end of the AC power source and a negative end of the second diode;
    a third diode, having a positive end connecting the negative end of the first diode;
    a fourth diode, having a positive end connecting the negative end of the second diode;
    a third capacitor, connected between the second end of the AC power source and a negative end of the third diode;
    a fourth capacitor, connected between the first end of the AC power source and a negative end of the fourth diode;
    a fifth diode, having a positive end connecting the negative end of the third diode;
    a sixth diode, having a positive end connecting the negative end of the fourth diode and a negative end connecting a negative end of the fifth diode to form a voltage output end; and
    a filter capacitor, connected between the voltage output end and the ground end.

2. The master-slave voltage doubling full-wave rectifier of claim 1, wherein each of the first and second electronic switches is a solid state device.

3. The master-slave voltage doubling full-wave rectifier of claim 2, wherein the solid state device is a MOSFET (metal-oxide-semiconductor field-effect transistor).

4. A master-slave voltage doubling full-wave rectifier comprising:
    a first switch diode, having a positive end connecting a ground end and a negative end connecting a first end of an AC (alternating current) power source;
    a second switch diode, having a positive end connecting a ground end and a negative end connecting a second end of the AC power source;
    a first diode, having a positive end connecting the first end of the AC power source;
    a second diode, having a positive end connecting the second end of the AC power source;
    a first capacitor, connected between the second end of the AC power source and a negative end of the first diode;
    a second capacitor, connected between the first end of the AC power source and a negative end of the second diode;

a third diode, having a positive end connecting the negative end of the first diode;
a fourth diode, having a positive end connecting the negative end of the second diode;
a third capacitor, connected between the second end of the AC power source and a negative end of the third diode;
a fourth capacitor, connected between the first end of the AC power source and a negative end of the fourth diode;
a fifth diode, having a positive end connecting the negative end of the third diode;
a sixth diode, having a positive end connecting the negative end of the fourth diode and a negative end connecting a negative end of the fifth diode to form a voltage output end; and
a filter capacitor, connected between the voltage output end and the ground end.

\* \* \* \* \*